United States Patent [19]

Herman

[11] 4,435,736
[45] Mar. 6, 1984

[54] ISOLATED MULTIPLE CORE MAGNETIC TRANSDUCER ASSEMBLY

[75] Inventor: Robert W. Herman, Laguna Beach, Calif.

[73] Assignee: New World Computer Company, Inc., Irvine, Calif.

[21] Appl. No.: 295,105

[22] Filed: Aug. 21, 1981

Related U.S. Application Data

[63] Continuation-in-part of Ser. No. 44,534, Jun. 1, 1979, abandoned.

[51] Int. Cl.³ .......................... G11B 5/60; G11B 5/20
[52] U.S. Cl. .................... 360/103; 29/603
[58] Field of Search ............ 360/103, 55, 102, 105, 360/106, 107, 109, 110, 122, 126

[56] References Cited

U.S. PATENT DOCUMENTS

| | | | |
|---|---|---|---|
| 2,957,051 | 10/1960 | Epstein et al. | 360/103 |
| 3,177,495 | 4/1965 | Felts | 360/103 |
| 3,249,701 | 5/1966 | Silver | 360/103 |
| 3,460,244 | 8/1969 | Metz | 360/121 X |
| 3,480,936 | 11/1969 | Gerlach et al. | 360/103 |
| 3,512,253 | 5/1970 | Perkins et al. | 360/103 X |
| 3,573,768 | 4/1971 | Harris | 360/103 |
| 3,579,214 | 5/1971 | Solyst | 360/107 |
| 3,593,326 | 7/1971 | Turner et al. | 360/103 |
| 3,593,330 | 7/1971 | Ackley | 360/103 |
| 3,657,711 | 4/1972 | Rencorel | 360/103 |
| 3,678,482 | 7/1972 | Billawala | 360/103 |
| 3,701,858 | 10/1972 | Prival et al. | 360/126 |
| 3,722,081 | 3/1973 | Neace | 360/103 X |
| 3,783,504 | 1/1974 | Prival et al. | 360/126 X |
| 3,792,492 | 2/1974 | Neace | 360/103 |
| 3,864,748 | 7/1973 | Herdman et al. | 360/102 |
| 3,913,139 | 10/1975 | Ito et al. | 360/103 |
| 3,925,884 | 12/1975 | Case | 360/103 X |
| 3,975,770 | 8/1976 | Spash et al. | 360/103 |
| 4,081,846 | 3/1978 | Roscamp et al. | 360/103 |
| 4,130,847 | 12/1978 | Head et al. | 360/103 X |
| 4,141,050 | 2/1979 | Wiseley | 360/104 |
| 4,212,044 | 7/1980 | Plotto | 360/103 |
| 4,225,891 | 9/1980 | Plotto | 360/103 |

OTHER PUBLICATIONS

Patent Abstracts of Japan, vol. 2, #92, Jul. 28, 1978.

*Primary Examiner*—Robert L. Richardson
*Attorney, Agent, or Firm*—Lyon & Lyon

[57] ABSTRACT

Disclosed herein is a magnetic transducer assembly including a plurality of magnetic cores affixed to a nonmagnetic slider, the slider having a multiplicity of fluid bearing surfaces for supporting the magnetic transducer assembly on a fluid bearing proximate to a rotating surface such as a magnetic disc. Each magnetic core has a corresponding slider fluid bearing surface of equal width, the magnetic cores being affixed to the trailing edge of the fluid bearing surfaces. The slider provides additional fluid bearing surfaces intermediate the corresponding fluid bearing surfaces.

26 Claims, 11 Drawing Figures

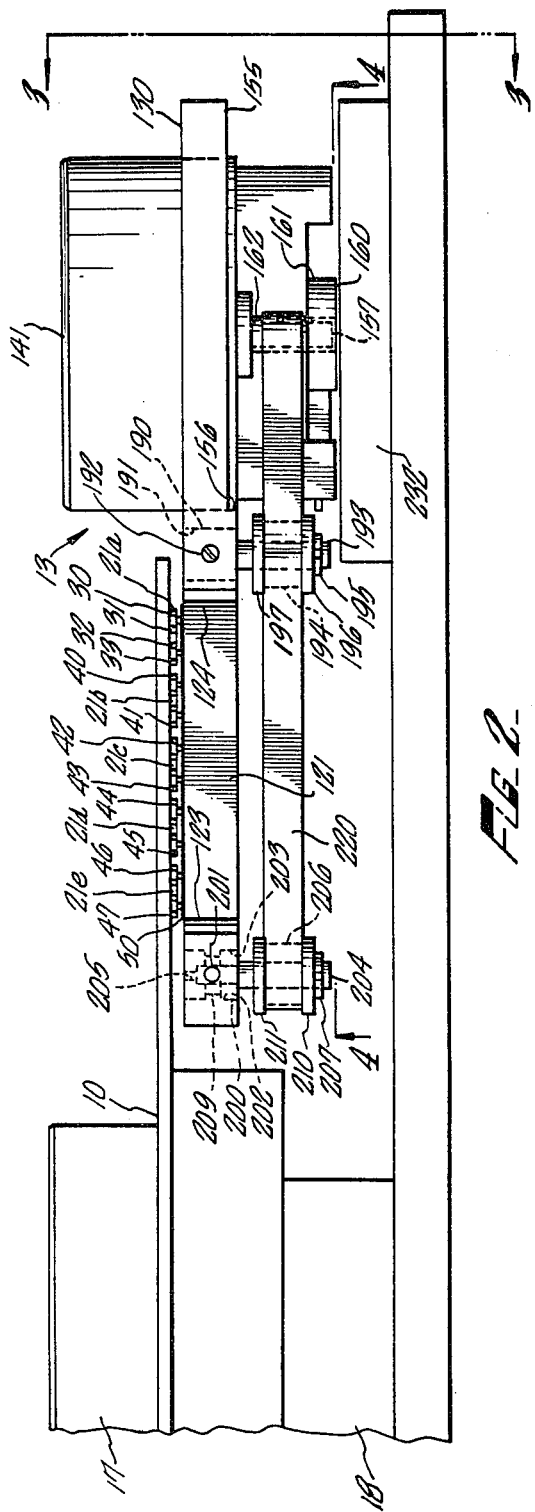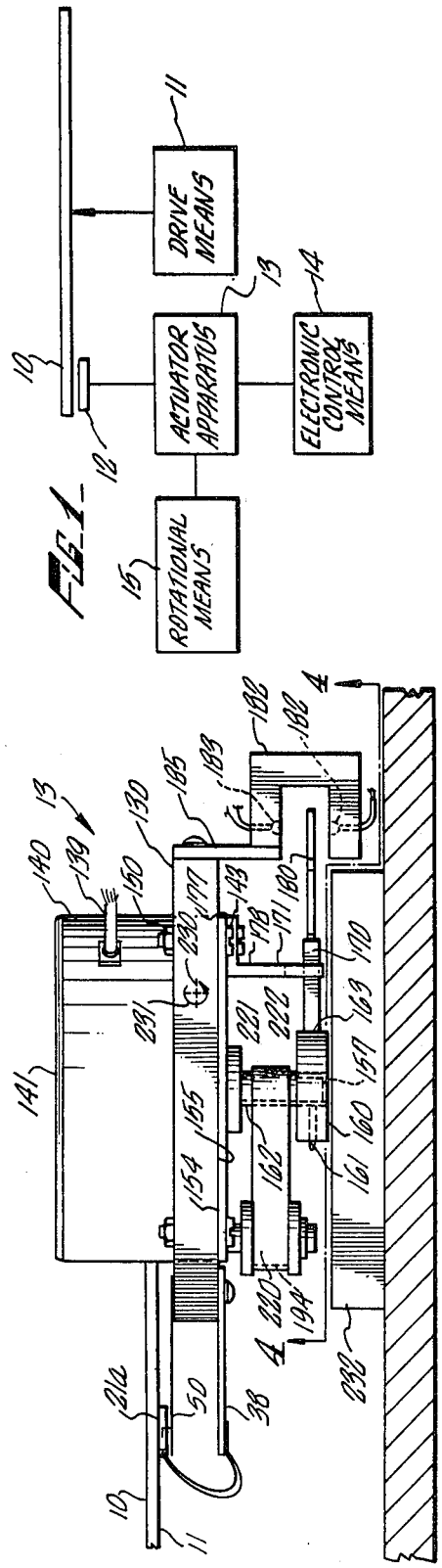

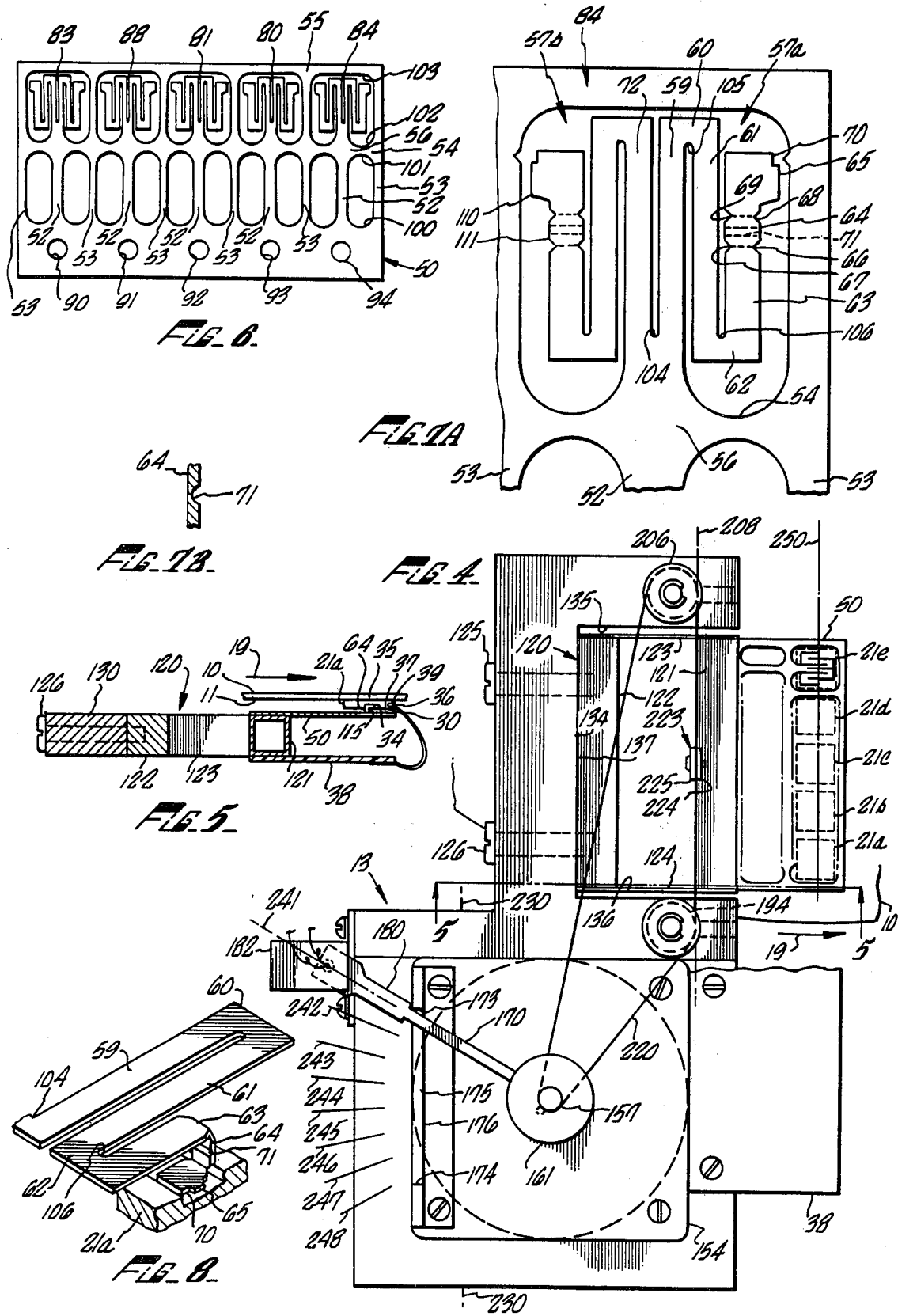

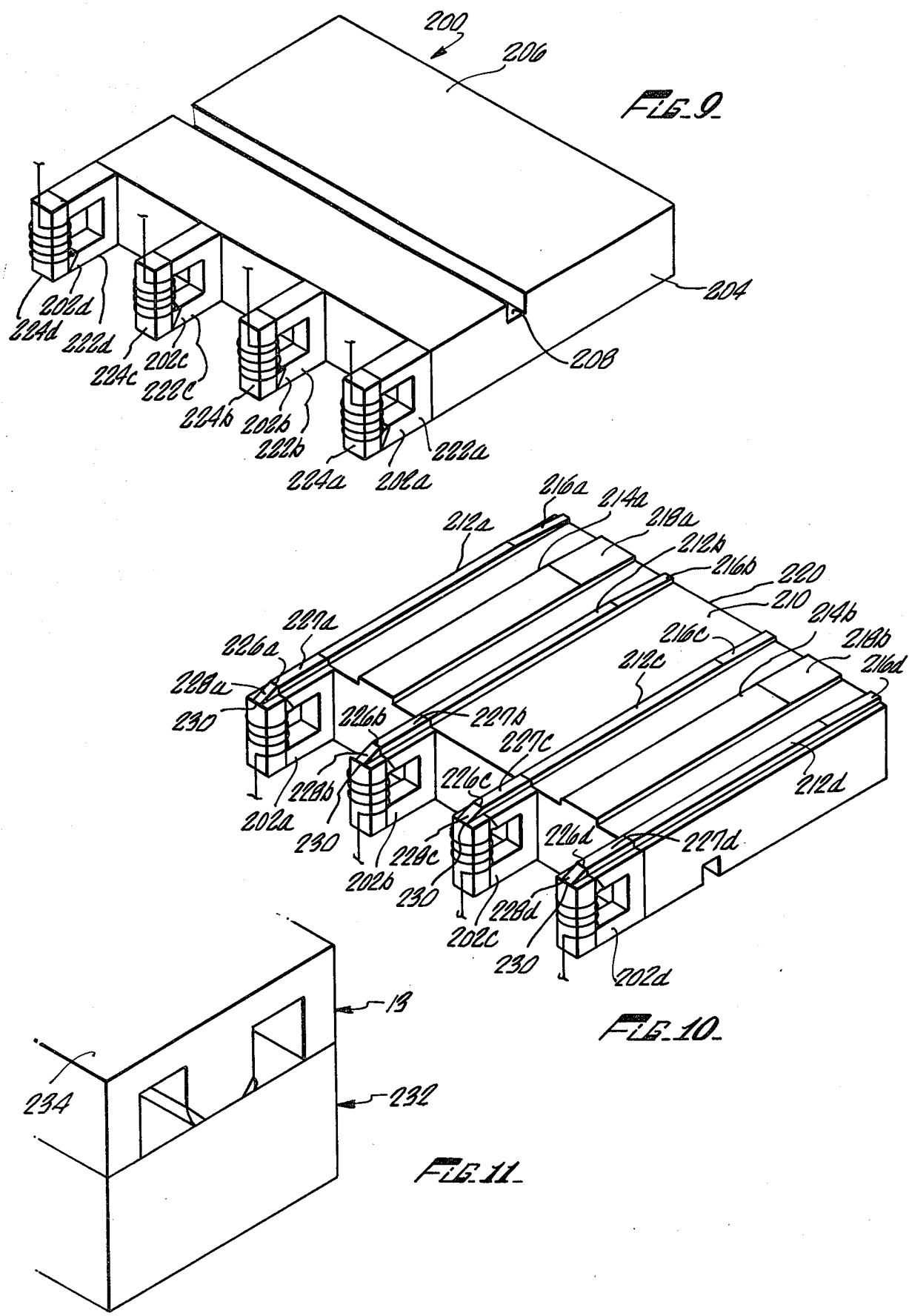

ISOLATED MULTIPLE CORE MAGNETIC TRANSDUCER ASSEMBLY

This application is a continuation-in-part application of U.S. application Ser. No. 44,534, filed June 1, 1979, and now abandoned, entitled "Isolated Multiple Core Magnetic Transducer Assembly", and assigned to the same assignee as the present application.

This invention relates generally to magnetic transducers and more particularly to a magnetic transducer assembly with multiple magnetic cores and a non-magnetic integral slider.

Reference is made to the following applications and issued patents: Ser. No. 44,535, filed June 1, 1979 and entitled "Actuator Apparatus for Magnetic Disc Recording Systems", now U.S. Pat. No. 4,280,157; Ser. No. 44,533, filed June 1, 1979 and entitled "Gas Circulation and Filtration Apparatus for Magnetic Disc Recording Systems", now U.S. Pat. No. 4,268,878; Ser. No. 44,536, filed June 1, 1979 and entitled "Suspension Device for Magnetic Transducers", now U.S. Pat. No. 4,245,267; and Ser. No. 199,092 filed Oct. 20, 1980 and entitled "Magnetic Transducer Suspension Device". The above-referenced applications and patents are assigned to the same assignee as this application and disclose and claim subject matter related to the present application.

Magnetic disc recording systems commonly utilize a plurality of magnetic transducers that are positioned near the surface of a rotating disc. These magnetic transducers are separated from the surface of the rotating disc by a relatively thin fluid bearing, to form what is commonly called a "flying" head. While some magnetic disc recording systems position one magnetic core adjacent to each magnetic track contained on the surface of the disc, other systems employ fewer magnetic cores and means for alternatively positioning these cores adjacent to the desired tracks.

Generally, the magnetic transducers used in either of the above systems include a plurality of magnetic cores that are carried in some manner upon a slider riding upon a thin fluid bearing proximate to the surface of the rotating disc. An exemplary multi-channel magnetic head is disclosed in Solyst U.S. Pat. No. 3,579,214. However, the slider disclosed therein is formed from a ferromagnetic block which is relatively expensive and magnetically couples together the multiple magnetic cores, thereby creating interference between adjacent cores. A second exemplary magnetic transducer is commonly termed a Winchester slider as referenced in Wiseley U.S. Pat. No. 4,141,050, column 2, lines 50–56. The Winchester slider employs three fluid bearing surfaces each having a magnetic core embedded therein. However, the magnetic cores and fluid bearing surfaces must be relatively wide to support the transducer assembly, thus requiring a relatively wide track and consequently diminishing the storage capacity of the magnetic disc. A third example of a multi-channel magnetic transducer assembly is disclosed in Neace U.S. Pat. No. 3,792,492 which describes an assembly of a plurality of magnetic cores mounted on a non-magnetic spacer which is bonded into a slotted air bearing member. This transducer assembly requires that the magnetic core and spacer combination be fitted into the air bearing member, increasing the manufacturing complexity and cost, and additionally increasing the total mass of the magnetic core, spacer and air bearing member combination.

The magnetic transducer assembly of the present invention, on the other hand, provides relatively narrow magnetic cores that are fixed to a non-magnetic slider in a generally low mass combination, thus overcoming the limitations described above. In an exemplary embodiment, the magnetic transducer assembly comprises a plurality of magnetic cores bonded to the trailing edge of a non-magnetic ceramic slider to form a flying head for magnetic disc. The surface of the slider nearest the disc includes a plurality of fluid bearing surfaces for supporting the magnetic transducer assembly on a fluid bearing near a rotating disc, and also includes leading edge surfaces. Trailing edge surfaces are provided by the magnetic cores, and a magnetizing coil is wound around each magnetic core.

To manufacture the examplary embodiment, a notched surface of a ferrite block is joined to a first surface of a ferrite plate. The obverse surface of the ferrite plate is next joined to a block of non-magnetic ceramic material such as barium titanate. A channel is machined into a first surface of the ceramic block parallel to the ferrite block and plate to form a suitable mounting surface. On the opposite side of the ceramic block and perpendicular to the ferrite block and plate, a plurality of notches are formed into the assembly of the ferrite block and plate as well as the ceramic block, to define the fluid bearing surfaces.

Portions of the ferrite block and plate are then removed to define individual magnetic cores that are isolated by the non-magnetic ceramic block. Individual magnetic transducers including four magnetic cores are machined from the assembly of the ferrite block, ferrite plate and ceramic block. A hydrodynamic leading edge is then formed on the leading edge of the fluid bearing surfaces of the magnetic transducers, and a trailing edge is formed on the magnetic cores of the transducers.

It is thus an object of this invention to provide an improved magnetic transducer assembly with multiple magnetic cores.

It is another object of this invention to provide a magnetic transducer assembly with multiple magnetic cores bonded to non-magnetic material.

It is a further object of this invention to provide a magnetic transducer assembly with multiple magnetic cores that are bonded to a single non-magnetic slider.

It is yet another object of the present invention to provide a magnetic transducer assembly with relatively narrow magnetic cores supported by a non-magnetic slider.

These and other objects and advantages of the present invention will be apparent from the following description and accompanying drawings.

FIG. 1 is a perspective view of the magnetic transducer assembly illustrating the mounting surface and the magnetic cores.

FIG. 2 is a perspective view of the magnetic transducer assembly depicting the fluid bearing surfaces and the magnetic cores.

FIGS. 3–7 illustrate the magnetic transducer assembly manufacturing steps.

FIG. 8 is a perspective representation of a plurality of magnetic transducer assemblies in use.

FIG. 9 is a perspective view of another embodiment of the magnetic transducer assembly illustrating the mounting surface and the magnetic cores.

FIG. 10 is a perspective view of embodiment of FIG. 9 illustrating the fluid bearing surfaces and the magnetic cores.

FIG. 11 depicts a portion of the manufacturing process of the magnetic transducer assembly of FIGS. 9 and 10.

Turning now to the drawings, the magnetic transducer assembly 1 of the present invention, as shown in FIGS. 1 and 2, comprises a plurality of magnetic cores 2a-d, bonded to a bonding surface or trailing edge 3 of a non-magnetic ceramic slider 4. The surface 5 of the slider 4, shown in detail in FIG. 2 and the surface nearest the disc during normal operation, is machined to form a plurality of track fluid bearing surfaces 7a-d and ancillary fluid bearing surfaces designated typically at 8a and 8b. An adjoining leading edge angled surface 9a-f is formed into each fluid bearing surfaces of the slider 4 and trailing edge angled surfaces 10a-d adjoining the fluid bearing surface are formed into each magnetic core 2a-d. A magnetizing coil 11a-d is wound around each of the magnetic cores 2a-d.

Each magnetic core 2a-d may further include a generally C-shaped member 12a-d which has first and second ends at the open portion of the C-shaped member 12a-d and a plate member 12e-h bonded to the first and second ends. The C-shaped members 12a-d and the plate members 12e-h are bonded to define a gap 29a-d between the C-shaped member 12a-d and the plate members 12e-h.

An exemplary process for forming an individual magnetic transducer assembly begins as shown in FIG. 3 with a ferrite block 13 that has a first upper surface 15 into which are formed notches 15 and 16. Each notch 15 and 16 typically has two surfaces 17 and 18 perpendicular to the surface 14 and an angled sidewall 19 formed nearest the centerline of the ferrite block 13 and angled approximately thirty degrees from surface 14. The ferrite block 13 also has a second lower surface 20 that is opposite and parallel to the surface 14.

Once the notches 15 and 16 are formed, the ferrite block 13 is rotated about its longitudinal axis and the surface 14 is bonded to a first upper surface 25 of a ferrite plate 27 as shown in FIG. 4. The bonding technique utilized a glass 28, as is well known to those skilled in the art, to achieve a gap 29 between the ferrite block 13 and the ferrite plate 27 in the range of twenty-five micro-inches to seventy-five micro-inches. An exemplary manufacturer of magnetic transducer assemblies utilizing such techniques is Magnetic Arts, 1310 Industrial Avenue, Escondido, Calif. 92025.

As shown in FIG. 5, a second lower surface 26 of the ferrite plate 27 is similarly bonded to a ceramic base 40, which is preferably barium titanate or other suitable material. A pair of notches 41 and 42 are formed then into opposing surfaces 43 and 44, respectively, of the ceramic base 40. The surfaces 43 and 44 and notches 41 and 42 are parallel to notches 15 and 16. A surface 45 of the ceramic base 40 is opposite from ferrite plate 27 and is adjacent to surfaces 43 and 44.

The ferrite block 13, ferrite plate 27, and ceramic base 40 are parted along a plane 50 which is substantially intermediate and parallel to the surfaces 43 and 44, resulting in two essentially identical bar assemblies 51 and 52. Each bar assembly 51 and 52 has a forward surface 53 and 54, which originally comprised the surface 45 of the ceramic base 40, and a trailing surface 55 and 56 which originally comprised the surface 20 of the ferrite block 13. Additionally, two new fluid bearing surfaces 50 and 61 are formed. The surface 60 is opposite from and parallel to the surface 44 of bar assembly 51; the surface 61 is similarly opposite from and parallel to the surface 43 of the bar assembly 52.

The bar assemblies 51 and 52 then are rotated and aligned as shown in FIG. 6 such that the forward surface 53 of the bar assembly 51 abuts the trailing edge 56 of the bar assembly 52, and such that the surfaces 44 and 43 are coplanar, thus aligning the fluid bearing surfaces 60 and 61. Track gas bearing surfaces 7a-d, and ancillary gas bearing surfaces 8a and 8b shown in FIGS. 2 and 6 are machined into the fluid bearing surfaces 60 and 61 perpendicular to the notches 41 and 42. The pattern of track fluid bearing surfaces 7a-d and intermediate ancillary bearing surfaces 8a-b fluid dynamically isolated from the track gas bearing surfaces 7a-d may be repeated across the length of the bar assemblies 51 and 52, although those skilled in the art will recognize that the pattern shown in FIG. 6 may be varied without harmful result.

The assemblies 51 and 52 are again rotated as illustrated in FIG. 7 such that the fluid bearing surface 60 of the bar assembly 51 abuts the surface 43 of bar assembly 52, the assemblies 51 and 52 being further aligned such that a plane 78 perpendicular to the track fluid bearing surfaces 7a-d and passing through an edge 79 of the track fluid bearing surfaces 7a-d will pass through an edge 80 of the corresponding track fluid bearing surface 81. Additionally, the forward surfaces 53 and 54 are aligned to be coplanar. Once so positioned, grooves 85a-d are formed through the ferrite material remaining from the ferrite block 13 and the ferrite plate 27 to define magnetic cores typically designated 2a-d.

Individual magnetic transducer assemblies generally designated 1 as shown in FIGS. 1 and 2 are parted from the bar assemblies 51 and 52 of FIG. 7 along planes typically designated 105 and 106 that are perpendicular to the track fluid bearing surfaces 7a-d and ancillary fluid bearing surfaces 8a and 8b, the planes 105 and 106 being selected so as to define a magnetic transducer assembly 1 containing four magnetic cores 2a-d with gaps 29a-d and the associated equal width, colinearly aligned track fluid bearing surfaces 7a-d, and two ancillary fluid bearing surfaces 8a and 8b.

The fluid bearing surfaces of the magnetic cores 7a-d (FIG. 2) which adjoin the track fluid bearing surfaces 7a-d are then ground to define a trailing edge angle into adjoining trailing edges 10a-d which may, for example, be on the order of eight degrees. The trailing edge angle may begin approximately within five-thousandths an inch from the gap originally formed at 29 (FIG. 4) and generally designated 29a-d in FIG. 2. The magnetic transducer assembly 1 is further ground to define a leading edge angle on the order of one-half degree into leading edges 9a-f which extend approximately forty-thousandths of an inch from the leading edge surface 131. It will be remembered that the surface 131 was originally part of the forward surface 54 of the bar assembly 52. To complete the magnetic transducer assembly 1, a length of wire 94 is wound through each magnetic core 2a-d in a manner that is well known in the art to form magnetizing coils 11a-d.

In operation, five typical magnetic transducer assemblies 100 through 104 as shown in FIG. 8 are affixed to a suspension spring 141 at notches such as the notch 140 of the magnetic transducer assembly 1 in FIG. 1. The suspension spring 141 urges the magnetic transducer assemblies 100 through 104 toward the surface of a disc 142 rotating in a direction indicated by arrow 150. A suitable suspension spring 141 is disclosed in co-pending application Ser. No. 44,536, filed June 1, 1979, now U.S. Pat. No. 4,245,267. Another suitable suspension device is disclosed in co-pending U.S. application Ser. No. 199,092 filed Oct. 20, 1980. The nominal spacing between typical magnetic cores 2a-d of a typical magnetic transducer assembly 1 is equal to the distance between nine tracks of recorded information of the surface of disc 142, as also described in U.S. patent application Ser. No. 44,535, filed June 1, 1979, now U.S. Pat. No. 4,280,157. As the suspension spring 141 traverses the C-surface of the disc 142 a distance perpendicular to the direction of rotation that is equal to the distance between eight tracks of recorded information, magnetic transducer assemblies 100 through 104 will be moved across a total of 160 tracks of information.

In a preferred embodiment, the initial length of the ferrite block 13, the ferrite plate 27 and the ceramic base 40 is approximately eight inches; thus a plurality of magnetic transducer assemblies typically designated 1 are manufactured at one time, resulting in a relatively low-cost low-mass magnetic transducer assembly with narrow track widths and magnetically isolated magnetic cores.

Another embodiment of a magnetic transducer assembly in accordance with the present invention is shown in FIGS. 9 and 10. As shown therein, a magnetic transducer assembly 200 is generally similar to the transducer assembly of FIGS. 1 and 2. However, as will be apparent from the following description, the magnetic cores of the transducer assembly 200 are advantageously disposed so as to place a plurality of gaps proximate a trailing edge of the transducer assembly. In use, this allows the gaps to be closer to a moving magnetic surface than the gaps of the magnetic transducer assembly 1 of FIGS. 1 and 2. Consequently, this gap positioning as seen in FIGS. 9 and 10 provides higher signal levels from the magnetic cores which contributes to increased resolution and track density in a magnetic disc recording system.

With reference to FIGS. 9 and 10, the magnetic transducer assembly 200 comprises a plurality of magentic cores 202a-202d bonded to a non-magnetic ceramic slider 204. The slider 204 includes a mounting surface 206 with a groove 208. A bearing surface 210 on a surface of the slider 204 which is opposite the mounting surface 206 is machined to include a plurality of track bearing surfaces 212a-212d and ancillary bearing surfaces 214a, 214b. Each of the surfaces 212a-212d and 214a, 214b is adapted to be substantially parallel to the direction of travel of a moving magnetic surface proximate which the bearing surface 210 of the transducer assembly may be positioned in use. The slider 206 defines a leading edge 220 which is adjacent to leading surfaces or edges 216a-216d and 218a, 218b inclined approximately one-half degree from a plane defined by the bearing surfaces 212a-212d and 214a, 214b. The leading edges 216a-216d and 218a, 218b help to form a fluid bearing between the transducer assembly 200 and the moving magnetic surface. As is seen in FIG. 10, the leading edges 216a-216d and 218a, 218b are adjoining and contiguous with the surfaces 212a-212d and 214a, 214b.

Each of the magnetic cores 202a-202d comprises a generally C-shaped member 222a-222d and a plate member 224a-224d. The open ends of the C-shaped members 222a-222d are bonded to respective plate members 224a-224d to form individual magnetic circuits for each of the cores 202a-202d, each magnetic circuit including a respective gap 226a-226d. The magnetic cores 202a-202d have bearing surfaces 227a-227d adjoining and aligned with the track bearing surfaces 212a-212d and trailing surfaces or edges 228a-228d adjoining and contiguous with the bearing surfaces 227a-227d. The trailing edges terminate at a transducer assembly trailing edge 230 and are inclined approximately eight degrees from a plane defined by the bearing surfaces 212a-212d, 214a-214b, and 227a-227d.

As shown in FIGS. 9 and 10, the backs of the C-shaped members 222a-222d are bonded to the slider 204. This positions the respective plate members 224a-224d and the gaps 226a-226d farther from the slider 204 as compared with the transducer assembly 1 of FIGS. 1 and 2 and consequently nearer the trailing edge 230 of the transducer assembly 200. It is to be noted that when the magnetic transducer assembly 200 is in use, it is proximate a magnetic surface and is angled slightly upwardly with respect to the direction of travel of the moving magnetic surface, that is, the leading edge 220 is somewhat higher than the trailing edge 230. By positioning the gaps 226a-226d nearer the trailing edge 230 of the transducer assembly as compared with the transducer assembly of FIGS. 1 and 2, the gaps 226a-226d are nearer to the moving magnetic surface than with the assembly of FIGS. 1 and 2. This relationship provides higher signal levels and contributes to increased track resolution and density, important aspects of a magnetic recording system.

The transducer assembly 200 of FIGS. 9 and 10 can be formed generally in accordance with the process described above for the transducer assembly of FIGS. 1 and 2. However, once the ferrite block 13 is formed, it is then bonded to a ferrite plate 232 which is advantageously approximately as thick or slightly thicker than the ferrite block 13 as shown in FIG. 11. The increased thickness of the ferrite plate 232 of FIG. 11 as compared with the ferrite plate 27 of FIG. 4 allows the thickness of the gaps 226a-226d to be more closely controlled as the plate 232 is bonded to the block 13, thereby providing better uniformity between the magnetic cores of a transducer assembly and between the magnetic cores of similarly formed transducer assemblies. A back surface 234 of the ferrite block 13 is then bonded to the ceramic base 40, and the ferrite plate 232 is then ground away to a suitable thickness as shown by the plate members 224a-224d in FIGS. 9 and 10.

It is to be noted that this forming process provides at least two advantages to the magnetic transducer assembly 200. First, the increased thickness of the ferrite plate 232 helps to control the thickness of the gaps 226a-226d. Secondly, this forming process positions the gaps 226a-226d nearer the trailing edge 230 to consequently provide higher signal levels from the cores 226a-226d. Also, the forming process as described for the magnetic transducers 1 and 200 accurately controls the positions of the gaps 29a-29d (FIG. 2) and the gaps 226a-226d so that the heights of these gaps is uniform with respect to a moving magnetic surface when the magnetic transducers are in use and so that spacing between adjacent gaps (i.e., track spacing) is accurately maintained. This accurate positioning results at least from the fact that the magnetic cores of the transducer assemblies 1 and 200 all begin as a ferrite block 13 with ferrite plates 27 or 232 and that the individual cores are not formed until the ferrite block 13 and the ferrite plates 27 or 232 are bonded to the ceramic base 40. Thus, the positioning of the gaps is very accurate since the individual gaps are all mechanically related to a single original subassembly. This advantage overcomes difficulties present in the prior art where individual magnetic cores were positioned with respect to a slider using a jig or other device, thus leading to inaccuracies in gap height and track spacing.

The transducer assembly 200 can be used as described previously. When so used, the assembly 200, as does the assembly 1, rides on a fluid bearing formed between the moving magnetic surface and the transducer assembly and assumes a slight up pitch with respect to the direction of travel of the magnetic surface, thus positioning the gaps 226a–226d proximate the magnetic surface and nearer the magnetic surface than the corresponding gaps 29a–29d of the transducer assembly 1.

Having thus described several embodiments of my invention in detail, it is to be understood that numerous equivalents and alternatives which do not depart from the invention will be apparent to those skilled in the art, given the teachings herein. Thus, my invention is not to be limited to the above description but is to be of the full scope of the appended claims.

What is claimed is:

1. A magnetic transducer assembly adapted for recording or retrieving information from a moving magnetic surface, comprising:
   a slider of non-magnetic material having a slider bearing surface adapted to be disposed adjacent to said moving magnetic surface, said slider bearing surface adapted to cooperate with said moving magnetic surface and a fluid within which said moving magnetic surface moves to form a fluid bearing between said slider bearing surface and said moving magnetic surface, said fluid bearing adapted to support said magnetic transducer assembly, and said slider having mounting surface means opposite said slider bearing surface for mounting said slider to suspension means; and
   a plurality of magnetic cores each individually supported by said slider to substantially magnetically isolate each of said magnetic cores from the other of the magnetic cores, each of said magnetic cores including a core bearing surface adjoining said slider bearing surface and adapted to be disposed adjacent said moving magnetic surface, said core bearing surface adapted to cooperate with said moving magnetic surface and said fluid to form a fluid bearing between said core bearing surface of each of said plurality of cores and said moving magnetic surface, each of said core bearing surfaces further including a gap adapted to be proximate said moving magnetic surface when said magnetic transducer assembly is supported by said fluid bearing with respect to said moving magnetic surface.

2. A magnetic transducer assembly as in claim 1 wherein each of said magnetic cores comprises a generally C-shaped member having first and second ends and a plate member bonded to said first and second ends to define a magnetic circuit, said magnetic circuit including said gap.

3. A magnetic transducer assembly as in claim 2 wherein said magnetic transducer assembly includes a trailing edge defined by said individually supported magnetic cores and said C-shaped member is bonded to said slider to position said gap proximate said trailing edge.

4. A magnetic transducer assembly as in claim 1 wherein said moving magnetic surface moves in a predetermined direction and said slider includes a leading edge and said magnetic cores each include a trailing edge, said magnetic transducer assembly adapted to be disposed adjacent to said moving magnetic surface such that said predetermined direction is from said leading edge to said trailing edges, said slider additionally including a leading edge surface proximate said leading edge and adjacent said slider bearing surface, said leading edge surface inclined from a plane defined by said slider bearing surface.

5. A magnetic transducer assembly as in claim 4 wherein said leading edge surface is inclined approximately one-half degree from said plane.

6. A magnetic transducer assembly as in claim 1 wherein said moving magnetic surface moves in a predetermined direction and said slider includes a leading edge and said magnetic cores each include a trailing edge, said magnetic transducer assembly adapted to be disposed adjacent to said moving magnetic surface such that said predetermined direction is from said leading edge to said trailing edges, each of said core bearing surfaces including a trailing edge surface proximate said trailing edge and inclined from a plane defined by said slider bearing surface.

7. A magnetic transducer assembly as in claim 6 wherein each of said trailing edge surfaces is inclined approximately eight degrees from said plane.

8. A magnetic transducer assembly as in claim 1 wherein said moving magnetic surface moves in a predetermined direction and said slider bearing surface comprises a plurality of track bearing surfaces and a plurality of ancillary bearing surfaces adapted to be substantially parallel to said predetermined direction.

9. A magnetic transducer assembly as in claim 8 wherein each of said gaps is colinearly aligned with a corresponding one of said track bearing surfaces.

10. A magnetic transducer assembly as in claim 9 wherein said track bearing surfaces and said gaps are of equal width.

11. A magnetic transducer assembly as in claim 8 wherein said ancillary bearing surfaces are intermediate adjacent pairs of said track bearing surfaces.

12. A magnetic transducer assembly as in claim 11 including recessed regions between said ancillary bearing surfaces and said track bearing surfaces to fluid-dynamically isolate said ancillary bearing surfaces and said track bearing surfaces.

13. A magnetic transducer assembly for recording or retrieving information from a moving magnetic surface, said moving magnetic surface moving in a predetermined direction, said magnetic transducer assembly comprising:
   a leading edge and a trailing edge, said magnetic transducer assembly adapted to be disposed adjacent to said moving magnetic surface such that said predetermined direction is from said leading edge to said trailing edge; a slider of non-magnetic material including,
   a plurality of track bearing surfaces and ancillary bearing surfaces, said track bearing surfaces and said ancillary bearing surfaces adapted to be disposed adjacent to said moving magnetic surface and substantially parallel to said predetermined direction, said track bearing surfaces and said ancillary bearing surfaces being adapted to cooperate with said moving magnetic surface and a fluid within which said moving magnetic surface moves to form a fluid bearing between said moving magnetic surface and said track bearing surfaces and between said moving magnetic surface and said ancillary bearing surfaces, said fluid bearing adapted to support said magnetic transducer assembly proximate said moving magnetic surface, a plurality of track leading edge surfaces proximate said leading edge and adjoining corresponding ones of said track bearing surfaces, said track leading edge surfaces inclined from a plane defined by said track bearing surfaces, and a plurality of ancillary leading edge surfaces proximate said leading edge and adjoining corresponding ones of said ancillary bearing surfaces, said ancillary leading edge surfaces inclined from a plane defined by said ancillary bearing surfaces; and a plurality of individual magnetic cores fixed to said slider to support and substantially magnetically isolate said magnetic cores, each of said magnetic cores comprising;

a generally C-shaped member having first and second ends, a plate member bonded to said ends to define a magnetic circuit having a gap between said C-shaped member and said plate member, said gap being adapted to be proximate to said moving magnetic surface when said magnetic transducer assembly is supported by said fluid bearing, said gap being co-linearly aligned with a corresponding track bearing surface, and a core bearing surface adjoining a corresponding one of said track bearing surfaces, each core bearing surface adapted to cooperate with said moving magnetic surface and said fluid to form a fluid bearing between said core bearing surface and said moving magnetic surface, said core bearing surface including a trailing edge surface proximate said trailing edge and inclined from said plane defined by said track bearing surfaces.

14. A magnetic transducer assembly as in claim 13 wherein said C-shaped member is bonded to said slider to position said gap proximate said trailing edge.

15. A magnetic transducer assembly as in claim 13 wherein said track leading edge surfaces are inclined approximately one-half degree from said plane defined by said track bearing surfaces and said ancillary leading edge surfaces are inclined approximately one-half degree from said plane defined by said ancillary bearing surfaces.

16. A magnetic transducer assembly as in claim 13 wherein said trailing edge surfaces are inclined approximately eight degrees from said plane defined by said track bearing surfaces.

17. A magnetic transducer assembly as in claim 13 wherein said ancillary bearing surfaces are intermediate adjacent pairs of said track bearing surfaces and said magnetic transducer assembly includes recessed regions between said ancillary bearing surfaces and said track bearing surfaces to fluid-dynamically isolate said ancillary bearing surfaces and said track bearing surfaces.

18. A magnetic transducer assembly as in claim 13 wherein each said gap and said corresponding track bearing surface are of equal width.

19. A magnetic transducer assembly for recording or retrieving information from a moving magnetic surface, said magnetic surface moving in a predetermined direction, said magnetic transducer assembly comprising:

a leading edge and a trailing edge, said magnetic transducer assembly adapted to be disposed adjacent to said moving magnetic surface such that said predetermined direction is from said leading edge to said trailing edge, a plurality of magnetic cores each comprising a generally C-shaped member having first and second ends and a plate member bonded to said first and second ends to define a magnetic circuit having a gap between said C-shaped member and said plate member;

a slider of non-magnetic material including a plurality of track bearing surfaces and ancillary bearing surfaces, said track bearing surfaces and said ancillary bearing surfaces adapted to be disposed adjacent to said moving magnetic surface and substantially parallel to said predetermined direction, said track bearing surfaces and said ancillary bearing surfaces being adapted to cooperate with said moving magnetic surface and a fluid within which said moving magnetic surface moves to form a fluid bearing between said moving magnetic surface and said track bearing surfaces and between said moving magnetic surface and said ancillary bearing surfaces, said fluid bearing adapted to support said magnetic transducer assembly proximate said moving magnetic surface, said ancillary bearing surfaces being intermediate adjacent pairs of said track bearing surfaces, said slider including recessed regions between said ancillary bearing surfaces and said track bearing surfaces to fluid-dynamically isolate said ancillary bearing surfaces and said track bearing surfaces, a plurality of track leading edge surfaces proximate said leading edge and adjoining corresponding ones of said track bearing surfaces, said track leading edge surfaces inclined approximately one-half degree from a plane defined by said track bearing surfaces, and a plurality of ancillary leading edge surfaces proximate said leading edge and adjoining corresponding ones of said ancillary bearing surfaces, said ancillary leading edge surfaces inclined approximately one-half degree from a plane defined by said ancillary leading edge surfaces; and said magnetic cores being integrally formed with said slider to support and substantially magnetically isolate said magnetic cores one from another, each of said gaps being colinearly aligned with a corresponding said track bearing surface and adapted to be positioned proximate said moving magnetic surface when said magnetic transducer assembly is supported by said fluid bearing, said magnetic cores each additionally including a core bearing surface adjoining a corresponding one of said track fluid bearing surfaces, said core bearing surface including a trailing edge surface proximate said trailing edge inclined approximately eight degrees from said plane defined by said track bearing surfaces.

20. A magnetic transducer assembly as in claim 19 wherein said C-shaped member is bonded to said slider to position said gap proximate said trailing edge.

21. A method of forming a magnetic transducer assembly comprising the steps of bonding a plate of magnetic material to a block of such material to form a predetermined gap therebetween, bonding the assembly of said magnetic block and plate to a non-magnetic base, forming a fluid dynamic bearing surface on one face of said base, forming a trailing edge on the assembly of said block and plate, removing material from said block and plate assembly to define a plurality of individual magnetic cores, each magnetic core supported by said non-magnetic base and winding a coil on each of said magnetic cores.

22. The method of claim 21 wherein the step of forming an aerodynamic bearing surface includes forming a plurality track bearing surfaces.

23. The method of claim 22 wherein the step of removing material from said block and plate assembly includes defining said plurality of individual magnetic cores in alignment with said track bearing surfaces.

24. A magnetic transducer assembly adapted for recording or retrieving information from a moving magnetic surface, comprising:

a slider of non-magnetic material having a slider bearing surface adapted to be disposed adjacent to said moving magnetic surface, said slider bearing surface adapted to cooperate with said moving magnetic surface and a fluid within which said moving magnetic surface moves to form a fluid bearing between said slider bearing surface and said moving magnetic surface, said fluid bearing adapted to support said magnetic transducer assembly, and said slider having mounting surface means opposite said slider bearing surface for mounting said slider to suspension means; and a plurality of magnetic cores each individually supported by said slider to substantially magnetically isolate each of said magnetic cores from the other of the magnetic cores.

25. A magnetic transducer assembly as in claim 24 wherein each of said magnetic cores comprises a generally C-shaped member having first and second ends and a plate member bonded to said first and second ends to define a magnetic circuit, said magnetic circuit including a gap.

26. A magnetic transducer assembly as in claim 25 wherein said magnetic transducer assembly includes a trailing edge defined by said individually supported magnetic cores and said C-shaped member is bonded to said slider to position said gap proximate said trailing edge.

* * * * *